3,124,417
METHOD FOR PREPARING METAL ALUMINUM
HYDRIDE COMPOUNDS
Mario D. Banus, Topsfield, Mass., assignor to Metal Hydrides Incorporated, Beverly, Mass., a corporation of Massachusetts
No Drawing. Filed Mar. 11, 1960, Ser. No. 14,190
7 Claims. (Cl. 23—14)

This invention relates to a method for preparing metal aluminum hydrides having the formula $M(AlH_4)_x$ where M is an alkali metal or alkaline earth metal and $x$ is the valence of the metal. More particularly, the invention relates to a method for preparing sodium aluminum hydride.

The patent to H. I. Schlesinger and A. E. Finholt No. 2,567,972, dated September 18, 1951, describes a method for preparing a metal aluminum hydride having the above formula. This method comprises reacting a hydride of an alkali metal or alkaline earth metal with an aluminum halide in an ether reaction medium. The reaction is illustrated by the equation:

$$4LiH + AlCl_3 \rightarrow LiAlH_4 + 3LiCl$$

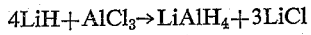

Lithium aluminum hydride of high purity has been prepared in high yield commercially for several years by this method. However, the method has not been found satisfactory for the preparation of sodium aluminum hydride and other metal aluminum hydrides.

I have discovered a method whereby sodium aluminum hydride and other alkali metal and alkaline earth metal aluminum hydrides having the formula $M(AlH_4)_x$ can be synthesized directly from the elements. In accordance with the invention an alkali metal, such as sodium, lithium or potassium, or an alkaline earth metal, such as calcium or magnesium, or the hydride of an alkali or alkaline earth metal, is heated at an elevated temperature in a confined reaction zone with finely divided aluminum metal and a catalytic amount of finely divided zinc as a reaction promoter in an inert liquid carrier in the presence of hydrogen under superatmospheric pressure while agitating the mixture until reaction between the aluminum, hydrogen and the alkali metal or alkaline earth metal or hydride thereof is complete. Preferably, the aluminum metal and the alkali metal or alkaline earth metal or hydrides thereof are used in about equimolar proportions. I have found a temperature between about 100° C. and 200° C. and a hydrogen pressure between about 2500 to 5000 p.s.i. to be suitable. A higher pressure may be used but is not necessary.

The amount of finely divided zinc used as a reaction promoter in the practice of the invention may vary from about 0.1 to 25 percent or more by weight based upon the weight of alkali metal or alkaline earth metal initially in the reaction mixture. Suitable inert liquid carriers are saturated liquid hydrocarbons, such as benzene, hexane, octane, ligroin and cyclohexane; the lower alkyl ethers, such as dimethyl ether, diethyl ether, diisopropyl ether and dibutyl ether; and ethers such as tetrahydrofuran, dioxane, dimethyl ether of ethylene glycol and the diethyl ether of diethylene glycol; and mixtures of ethers and liquid hydrocarbons.

The invention is illustrated further by the following specific example.

7.8 grams of aluminum, 6.4 grams of sodium metal, 1 gram of zinc dust and 125 ml. of tetrahydrofuran were charged into a 250 ml. Magne-Dash reactor fitted with a magnetic agitator and suitable heating means. Hydrogen was introduced into the reactor under a pressure of about 3000 p.s.i. The reaction mixture then was heated for 10 hours at a temperature of 175° C. After cooling, the mixture was filtered and the filtrate evaporated to dryness. The solid obtained weighed 3.7 grams and assayed 77 percent sodium aluminum hydride.

I claim:
1. The method for preparing a metal aluminum hydride having the formula $M(AlH_4)_x$ where M is a metal selected from the group consisting of alkali metals and alkaline earth metals and $x$ is the valence of the selected metal which comprises heating in a confined reaction zone a material selected from the group consisting of alkali metals, alkaline earth metals and hydrides of such metals with finely divided aluminum metal and finely divided zinc metal as a reaction promoter in an amount from about 0.1 to 25 percent by weight based upon the weight of said selected material used in an inert liquid carrier at a temperature above about 100° C. but below the decomposition temperature of the metal aluminum hydride in the presence of hydrogen under superatmospheric pressure above about 2500 p.s.i. while agitating the mixture until reaction between said selected material, aluminum and hydrogen is complete.
2. The method as claimed by claim 1 wherein said selected material is an alkali metal.
3. The method as claimed by claim 1 wherein said selected material is an alkali metal hydride.
4. The method as claimed by claim 2 wherein said elevated temperature is between 100° C. and 200° C. and said pressure is between 2500 and 5000 p.s.i.
5. The method as claimed by claim 3 wherein said elevated temperature is between 100° C. and 200° C. and said pressure is between 2500 and 5000 p.s.i.
6. The method as claimed by claim 4 wherein said selected material is sodium metal.
7. The method as claimed by claim 5 wherein said selected material is sodium hydride.

References Cited in the file of this patent
UNITED STATES PATENTS

| | | |
|---|---|---|
| 2,034,077 | Arnold et al. | Mar. 17, 1936 |
| 2,372,671 | Hansley | Apr. 3, 1945 |
| 2,729,540 | Fisher | Jan. 3, 1956 |
| 2,900,225 | Clasen | Aug. 18, 1959 |
| 2,900,402 | Johnson | Aug. 18, 1959 |
| 2,920,935 | Finholt | Jan. 12, 1960 |
| 2,992,248 | Pearson | July 11, 1961 |